US012724994B2

(12) United States Patent
Johnson et al.

(10) Patent No.: US 12,724,994 B2
(45) Date of Patent: Sep. 1, 2026

(54) PRINT RESPONSE DRIFT COMPENSATION MECHANISM

(71) Applicants: Scott R. Johnson, Boulder, CO (US); Pallavi Premkumar, Boulder, CO (US); Ziling Zhang, Boulder, CO (US); Mikel Stanich, Boulder, CO (US)

(72) Inventors: Scott R. Johnson, Boulder, CO (US); Pallavi Premkumar, Boulder, CO (US); Ziling Zhang, Boulder, CO (US); Mikel Stanich, Boulder, CO (US)

(73) Assignee: RICOH COMPANY, LTD., Tokyo (JP)

( * ) Notice: Subject to any disclaimer, the term of this patent is extended or adjusted under 35 U.S.C. 154(b) by 293 days.

(21) Appl. No.: 18/601,475

(22) Filed: Mar. 11, 2024

(65) Prior Publication Data

US 2025/0284912 A1 Sep. 11, 2025

(51) Int. Cl.
*G06K 15/02* (2006.01)
*G06F 3/12* (2006.01)

(52) U.S. Cl.
CPC ......... *G06K 15/027* (2013.01); *G06F 3/1258* (2013.01); *G06F 3/1259* (2013.01); *G06K 2215/101* (2013.01)

(58) Field of Classification Search
None
See application file for complete search history.

(56) References Cited

U.S. PATENT DOCUMENTS 7,095,531 B2 8/2006 Mizes et al.
7,724,406 B2 5/2010 Wang et al.
8,111,291 B2 * 2/2012 Liao ...................... H04N 23/68 348/255
8,118,391 B2 2/2012 Snyder et al.
(Continued)

FOREIGN PATENT DOCUMENTS

JP 2000211187 A 8/2000
JP 2000241913 A 9/2000
(Continued)

OTHER PUBLICATIONS

Notice of Reasons for Refusal for JP Application No. 2025-034158 mailed Feb. 13, 2026, 10 pages.

*Primary Examiner* — Darryl V Dottin
(74) *Attorney, Agent, or Firm* — Jaffery Watson Hamilton & DeSanctis LLP

(57) ABSTRACT

A printing system is disclosed. The printing system includes at least one physical memory device to store compensation logic and one or more processors coupled with the at least one physical memory device to execute the compensation logic to receive print response measurement data corresponding to print image printed on a print substrate with a transfer function applied to print image data that defines the print image, generate first processed print response data based on the print response measurement data, determine whether an absolute difference between the first processed print response data and a target response exceeds a first threshold and generate an updated compensation transfer (Continued)

function based on the first processed print response data and the target response upon a determination that the absolute difference exceeds a first threshold.

21 Claims, 15 Drawing Sheets

(56) References Cited

U.S. PATENT DOCUMENTS

| | | | |
|---|---|---|---|
| 8,149,458 | B2 | 4/2012 | Reed |
| 8,174,729 | B2 | 5/2012 | Igarashi |
| 8,253,975 | B2 | 8/2012 | Bai |
| 8,305,660 | B2 | 11/2012 | Zhang et al. |
| 8,314,959 | B2 | 11/2012 | Gross |
| 8,376,496 | B2 | 2/2013 | Lill et al. |
| 8,417,135 | B2 | 4/2013 | Mestha et al. |
| 8,908,229 | B2 | 12/2014 | Ichihashi |
| 9,152,095 | B1 | 10/2015 | Zaretsky et al. |
| 9,158,643 | B2 | 10/2015 | Gross et al. |
| 9,277,098 | B2 | 3/2016 | Shirakata |
| 9,280,734 | B2 | 3/2016 | Kishi |
| 9,375,963 | B2 | 6/2016 | Pous et al. |
| 9,876,943 | B2 | 1/2018 | Lin et al. |
| 9,950,548 | B2 | 4/2018 | Okamoto |
| 10,057,459 | B2 | 8/2018 | Yamamoto et al. |
| 10,326,913 | B2 | 6/2019 | Dobashi et al. |
| 10,569,583 | B2 | 2/2020 | Knabe et al. |
| 10,742,839 | B2 | 8/2020 | Matsuo |
| 10,906,296 | B2 | 2/2021 | Samadzadegan et al. |
| 11,025,791 | B2 | 6/2021 | Igarashi et al. |
| 11,157,786 | B1 * | 10/2021 | Gurudath ............. G06K 15/027 |
| 11,312,154 | B2 | 4/2022 | Petschik et al. |
| 11,405,530 | B1 | 8/2022 | Morales |
| 11,487,488 | B2 | 11/2022 | Yabe |
| 11,636,293 | B2 | 4/2023 | Morales |
| 11,724,516 | B2 | 8/2023 | Steenkamer et al. |
| 2020/0409617 | A1 | 12/2020 | Ruiz et al. |
| 2023/0342932 | A1 * | 10/2023 | O'Donoghue ........ G06T 7/0014 |

FOREIGN PATENT DOCUMENTS

| | | | |
|---|---|---|---|
| JP | 2004208168 | A | 7/2004 |
| JP | 2007181142 | A | 7/2007 |
| JP | 4293200 | | 7/2009 |
| JP | 4793292 | | 10/2011 |
| JP | 5268695 | | 8/2013 |
| JP | 5285334 | | 9/2013 |
| JP | 5409250 | | 2/2014 |
| JP | 5457307 | | 4/2014 |
| JP | 5617567 | | 11/2014 |
| JP | 5673182 | | 2/2015 |
| JP | 5700012 | | 4/2015 |
| JP | 5717361 | | 5/2015 |
| JP | 6050268 | | 12/2016 |
| JP | 6062832 | | 1/2017 |
| JP | 6311888 | | 1/2017 |
| JP | 6071513 | | 2/2017 |
| JP | 6189698 | | 8/2017 |
| JP | 6282145 | | 2/2018 |
| JP | 2018034400 | A | 3/2018 |
| JP | 6391575 | | 9/2018 |
| JP | 2018142782 | | 9/2018 |
| JP | 6468905 | | 2/2019 |
| JP | 6597070 | | 10/2019 |
| JP | 2020001228 | | 1/2020 |
| JP | 6764738 | | 10/2020 |
| JP | 6919560 | | 8/2021 |
| JP | 2022102896 | | 7/2022 |
| JP | 2022122194 | | 8/2022 |
| JP | 2023038807 | | 3/2023 |
| JP | 2023065935 | | 5/2023 |
| JP | 7340161 | | 9/2023 |
| JP | 2021081624 | | 1/2024 |

* cited by examiner

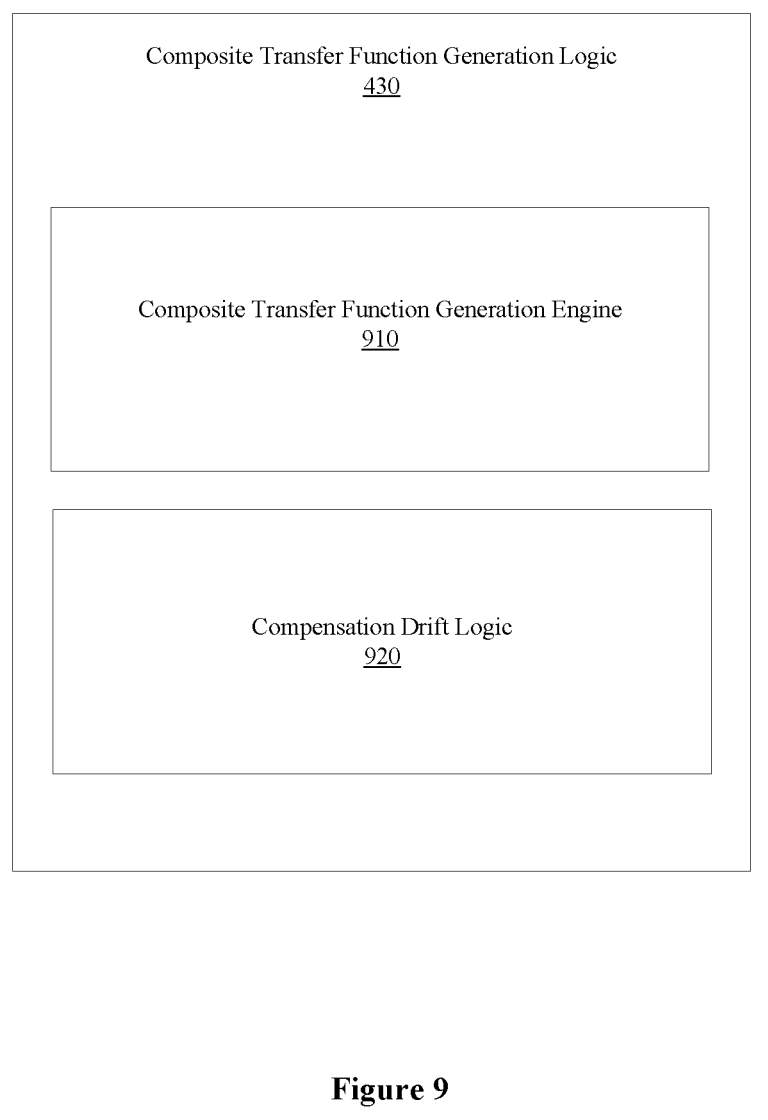

Composite Transfer Function Generation Logic
430

Composite Transfer Function Generation Engine
910

Compensation Drift Logic
920

Figure 9

PRINT RESPONSE DRIFT COMPENSATION MECHANISM

FIELD OF THE INVENTION

The invention relates to the field of image reproduction, and in particular, to printer calibration.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a one or more print engines that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

SUMMARY

In one embodiment, a printing system is disclosed. The printing system includes at least one physical memory device to store compensation drift logic and one or more processors coupled with the at least one physical memory device to execute the compensation logic to receive print response measurement data corresponding to print image printed on a print substrate with a transfer function applied to print image data that defines the print image, generate first processed print response data based on the print response measurement data, determine whether an absolute difference between the first processed print response data and a target response exceeds a first threshold and generate an updated compensation transfer function based on the first processed print response data and the target response upon a determination that the absolute difference exceeds a first threshold.

BRIEF DESCRIPTION OF THE DRAWINGS

A better understanding of the present invention can be obtained from the following detailed description in conjunction with the following drawings, in which:

FIG. 9 illustrates one embodiment of composite transfer function generation logic;

DETAILED DESCRIPTION

Print output Optical Density (OD) of production printers changes over time as components experience wear. For example, OD increases in an ink jet printer as drop sizes increase due to the wear of printhead components and other factors. This change in performance is undesirable because it impacts the consistency of color management. One approach to maintaining consistency is to recalibrate primary colors to a specific target OD using a customer's substrate (e.g., paper). However, having to perform recalibration for a substrate is a time consuming process.

According to one embodiment, a mechanism to monitor a printer for print density drift changes and automatically update the print image compensation to achieve a target print response is described. In such an embodiment, the target print response is achieved by using compensation transfer functions applied to print image data. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
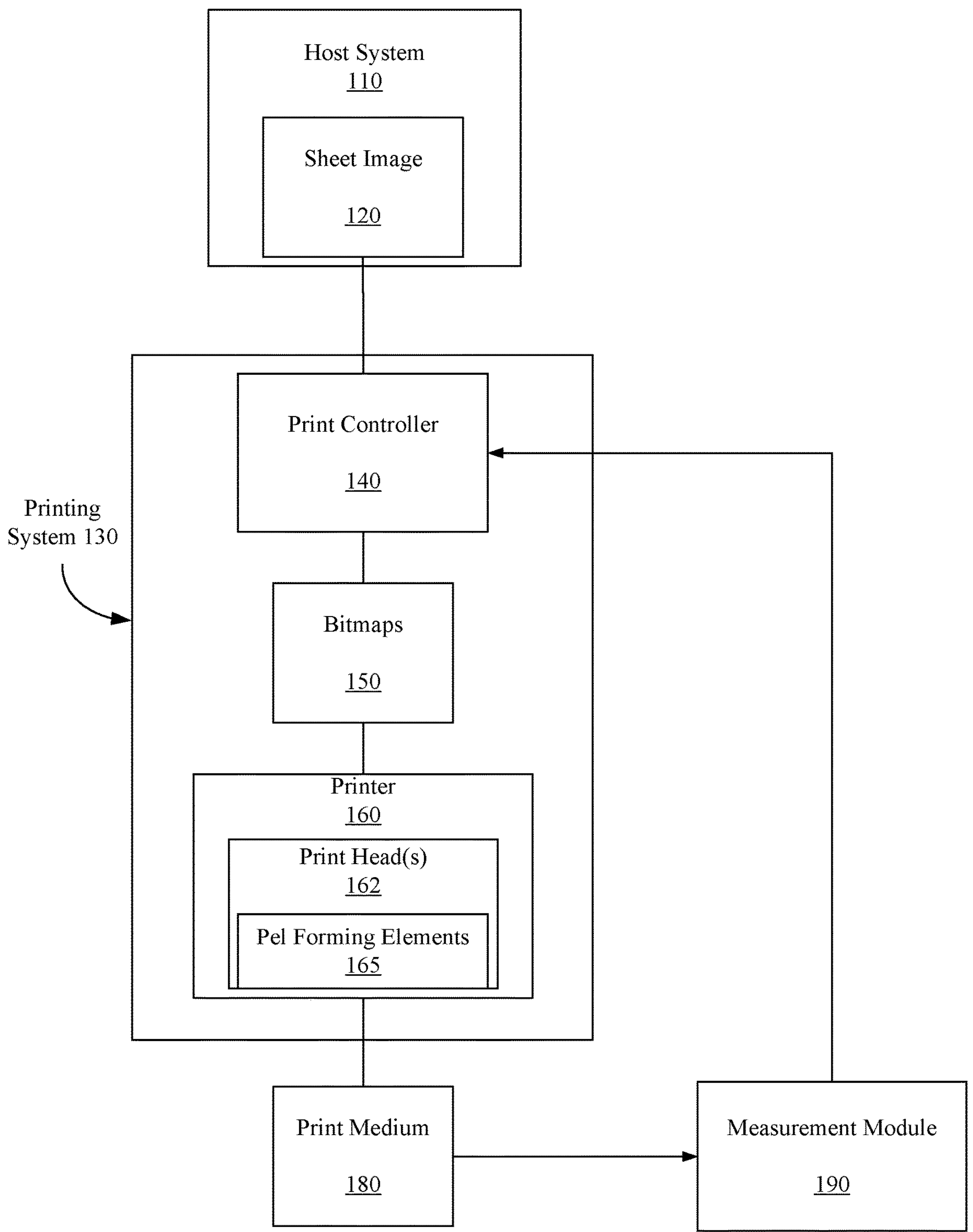
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., one or more print engines). Print medium 180 may include paper, card stock, paper board, corrugated fiberboard, film, plastic, synthetic, textile, glass, composite or any other tangible medium (e.g., a print substrate) suitable for printing. The format of print medium 180 may be continuous form or cut sheet or any other format suitable for printing. Printer 160 may be an ink jet, electrophotographic or another suitable printer type.

In one embodiment, printer 160 comprises one or more printheads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. The pel forming elements 165 may be assigned to one of one or more color planes that correspond to each of one or more types of marking materials (e.g., primary colors Cyan, Magenta, Yellow, and Black (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and Black, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be an image sensor to take measurements of printed images on print medium 180. Measurement module 190 may generate and transmit measurement data (e.g., print response measurement data). Measurement data may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer.

Figure 2A:
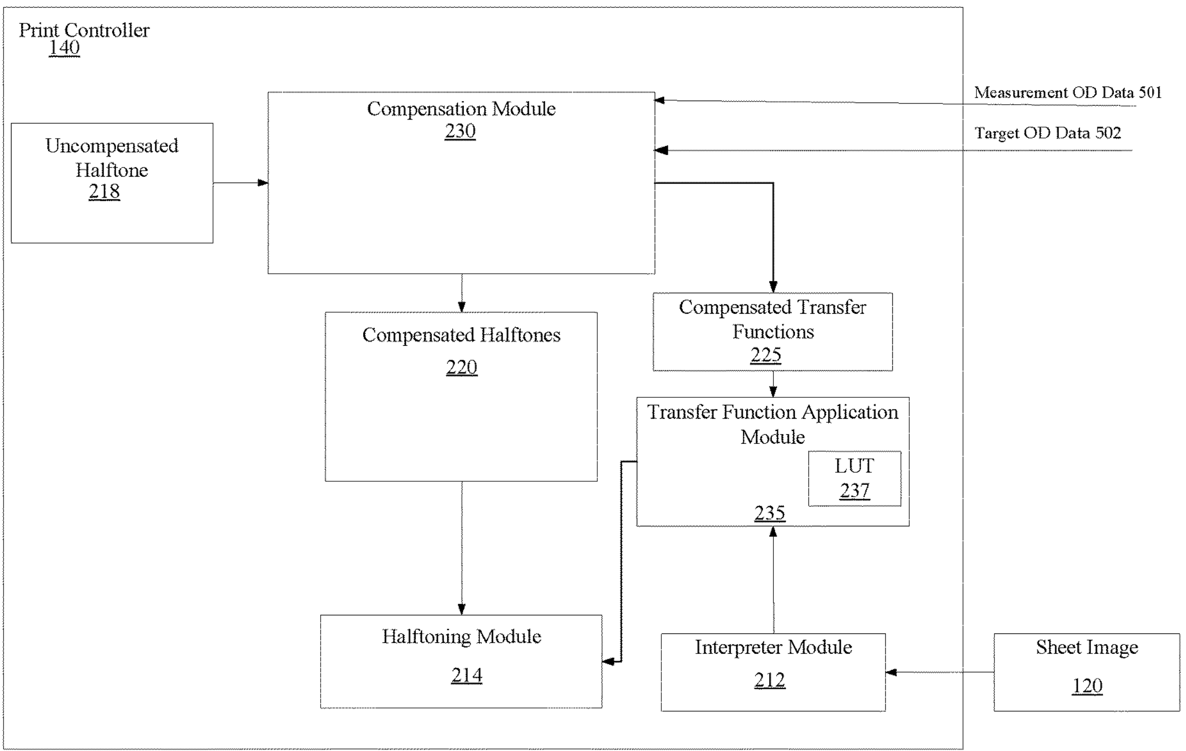
FIGS. 2A&2B are block diagrams illustrating embodiment of a print controller.
Figure 2B:
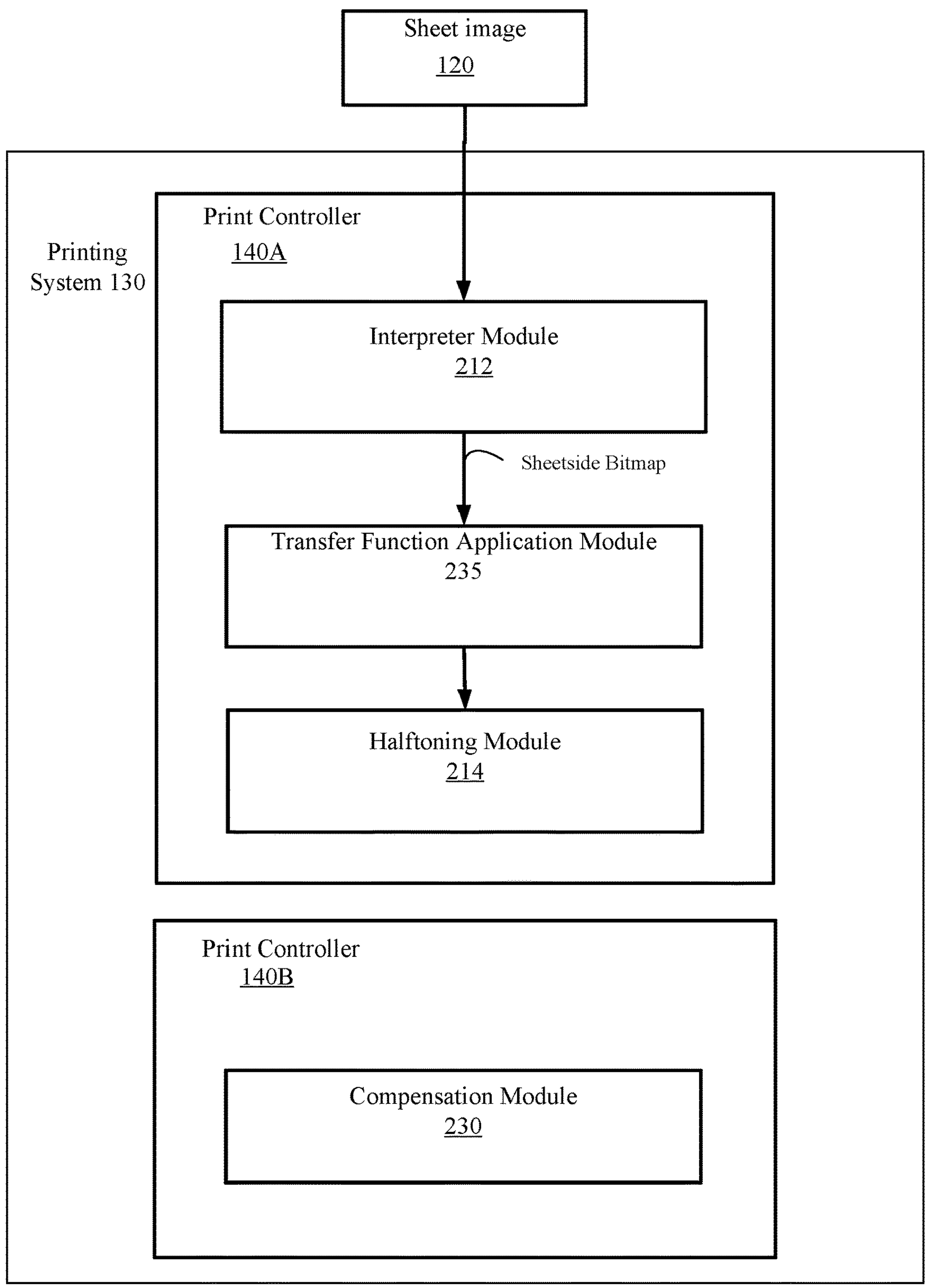

FIG. 2A illustrates a print controller 140 (e.g., DFE or digital front end), in its generalized form, including interpreter module 212, halftoning module 214 and compensation module 230. These separate components may represent hardware used to implement the print controller 140. Alternatively, or additionally, the separate components may represent logical blocks implemented by executing software instructions in a processor of the printer controller 140. FIG. 2B illustrates an alternative embodiment having print controllers 140A&140B. In this embodiment, print controller 140A includes interpreter module 212 and halftoning module 214, and print controller 140B includes compensation module 230. Print controllers 140A and 140B may be implemented in the same printing system 130 (as shown) or may be implemented separately.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (e.g., a Continuous Tone Image or CTI), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (e.g., CTI data) is transformed by applying the transfer functions to the CTI data prior to halftoning. A transfer function comprises a mapping of an input digital count to an output digital count for a system, where digital count is the gray level or color value representing the pels in a bitmap 150 (FIG. 1). Transfer functions may be used for calibrating printing system 130.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size (e.g., zero, small, medium and/or large). The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design including a set of threshold values for each pel in the sheetside bitmap, where there is one threshold for each non-zero ink drop size. The pel is halftoned with the drop size corresponding to threshold values for that pel. The set of thresholds for a halftone design is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone levels for each pel in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than, less than or equal to operations to determine the drop size by comparing the threshold or thresholds with image contone data for each pel. Multi-bit defines a power of two set of drop sizes (e.g., two-bit halftone designs have four total drops, including a zero drop size). While the power of two may be employed to define the number of drops, systems not following this such as a three total drop system may be used and are still considered multi-bit.

For multi-bit halftones, the MTA is a three-dimensional array including one two-dimensional array for each drop size (e.g., instructed ink drop size) transition. Thus, an MTA includes a set of two-dimensional arrays of thresholds for transition between drop sizes: a first plane (or plane 1) provides the threshold for the Large output level, while a second plane (or plane 2) and third plane (or plane 3) provide thresholds for the Medium and Small output levels respectively for a system having three drop sizes, not including zero drop size (none or Off). In other embodiments, different one-to-one relationships may be used since the correspondence between plane numbers and drop sizes is a matter of design choice.

To use these threshold arrays for halftoning, each multibit threshold array is tiled across the contone image data provided by the sheetside bitmap, which provides a set of threshold values for each pixel in the sheetside bit map. The contone image data (e.g., digital count, gray level data) is logically compared to the threshold data on a pixel basis. In the case of Large drops, they are produced by the halftoning when the image contone data is greater than the respective large threshold values in plane 1.

Medium drops are produced when the image contone data is greater than the medium drop plane 2 thresholds and the image contone data is less than or equal to the large drop thresholds in plane 1. Small drops are produced when the image contone data is greater than the small drop thresholds in plane 3 and the image contone data is less than or equal to the medium drop thresholds in plane 2.

Finally, the off/none drop size occurs for cases when the contone image data is less than or equal to the small drop thresholds in plane 3. In this embodiment of a two-bit multibit printing system, this set of four logical equations, used with thresholds from each plane of the multibit threshold array permit each printing drop size to be defined based on the contone values.

Alternate versions of the halftoning equations may also be defined. An example of an alternate set of halftoning logical expressions replaces the less than or equal to operation with less than and the greater than operation is replaced with greater than or equal to. A further variation uses the less than or equal to and greater than logical expressions starting with the test for the largest drop size first. If a drop size is not found the process continues with the logical expression for the next smallest drop size. If the sequential test for each drop size does not find a drop size, the none drop size is assumed. The threshold arrays for each different set of halftoning equations will vary and therefore the threshold arrays are generated assuming a given set of equations.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Compensation module 230 performs a compensation process on an un-compensated halftone 218, or previously generated uniformity compensated halftone, received at print controller 140 to generate one or more compensated halftones 220. A compensated halftone is a halftone that has been adjusted to achieve a target output response. Compensated halftones 220 are then received at halftoning module 214 along with the sheetside bitmap. In one embodiment, an un-compensated halftone 218 represents a reference halftone design that is modified to create the compensated halftones based on measurement OD data 501 (e.g., print response measurement data) and target OD data 502 (e.g., target response data). In such an embodiment, measurements of the system response (e.g., measurement optical density (OD) data 501) are received via measurement module 190 using the un-compensated halftone 218 for printing the test chart.

Compensation module 230 may alternatively perform a compensation process to generate compensated transfer functions 225 based on measurement OD data 501 and target OD data 502. The measurement units for measurement OD data 501 have the same units as target OD data 502. In such an embodiment, measurements of the system response (e.g., measurement optical density (OD) data 501) are received via measurement module 190 using compensated halftone 220 for printing the test chart. Compensated transfer functions 225 are then received at transfer function application module 235. Transfer function application module 235 applies the received compensation transfer functions 225 to print image data received from interpreter module 212 prior to performing halftoning at halftoning module 214. As mentioned above, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD versus input digital count data and measured OD versus output digital count data).

Compensation module 230 is further implemented to perform a calibration process to maintain optical density (OD) within printer 160 in order to compensate for OD differences from a target OD. According to one embodiment, a calibrated print system is a print system that achieves a first target response while printing onto a first print substrate with a first halftone design and first printer transfer function. M1 is a measured response corresponding to a target print system printing on the first print substrate using the first halftone design and none or an identity transfer function (e.g., digital count output=digital count input). The measurements units for the measured response M1 have the same units as the target response T1. M2 is a measured response corresponding to a calibrated print system printing on the second print substrate using the first halftone design and the first printer transfer function. T2 is the second target response while printing onto a second print substrate with a first halftone design and the first printer transfer function. The measurements units for the measured response M2 have the same units as the target response T2.

Figure 3:
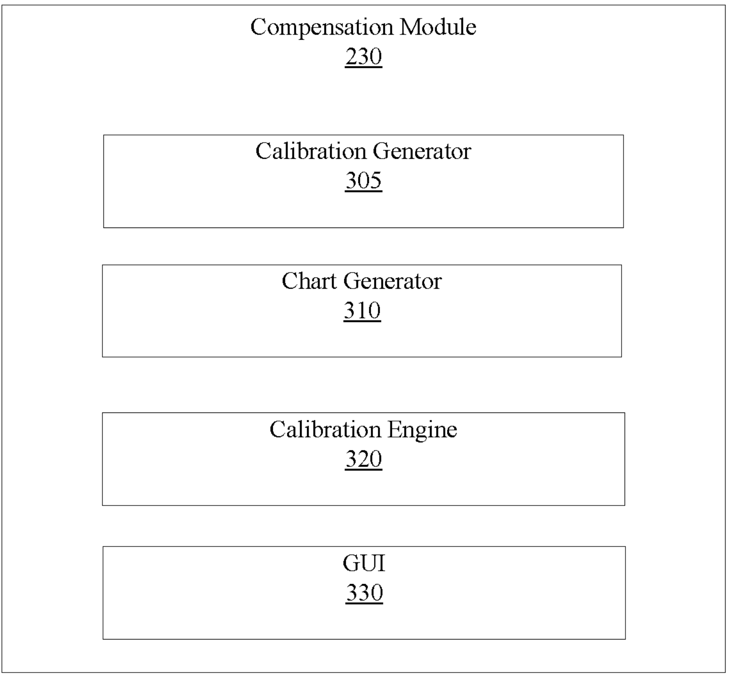
FIG. 3 illustrates one embodiment of compensation module.

FIG. 3 illustrates one embodiment of compensation module 230 including a calibration generator 305, chart generator 310 and calibration engine 320. Calibration generator 305 facilitates a calibration process at print system 130 by directing the calibration process. In one embodiment, the calibration process is performed to generate or update the print system (or printer) transfer function (e.g., for short term printer OD change compensation), print substrate transfer function and/or the composite transfer function. In such an embodiment, each calibration is based on a calibration performed using a print substrate (e.g., print medium or customer paper) to be implemented for print jobs at printing system 130. In a further embodiment, each calibration may be initiated by a system operator through a graphical user interface (GUI 330) in printing system 130.

As used herein, a printer transfer function (e.g., printerTF, a first printer transfer function) is a mapping of an input digital count to an output digital count for a print system to achieve the first target response (e.g., T1, reference ink deposition, OD target) while printing on the first print substrate (e.g., S1 or a reference print substrate) with the first halftone design (e.g., a reference halftone design). When the printer transfer function is applied to the print system, the print system becomes a calibrated print system. A print substrate transfer function (e.g., substrateTF) is a mapping of an input digital count to an output digital count for a calibrated print system to achieve a second target response (e.g., T2) while printing onto a second print substrate (e.g., S2, a customer print substrate) with a first halftone design and the first printer transfer function. A composite transfer function (or CTF) is a transfer function that is the composite of the printer transfer function and the print substrate transfer function.

Chart generator 310 prints a test chart upon initiation of a calibration process. In one embodiment, chart generator 310 generates an image (e.g., print image for the test chart) comprising a test pattern corresponding to one or more print heads 162, which is subsequently processed by measurement module 190 to generate OD measurement data. In a further embodiment, first measurement data is generated that is associated with an image printed during a first calibration process using an identity transfer function and an initial print substrate (e.g., a first print substrate). Similarly, second measurement data is generated by printing the image during a subsequent calibration process on a subsequent print substrate (e.g., a second print substrate) using a printer transfer function derived for the first print substrate. Third measurement data is generated by printing the image during a confirmation process on a subsequent print substrate using a printer transfer function and print substrate transfer function associated with that print substrate. In one embodiment, the print substrate used during a subsequent print substrate calibration may be the same or different than the initial print substrate.

Figure 4:
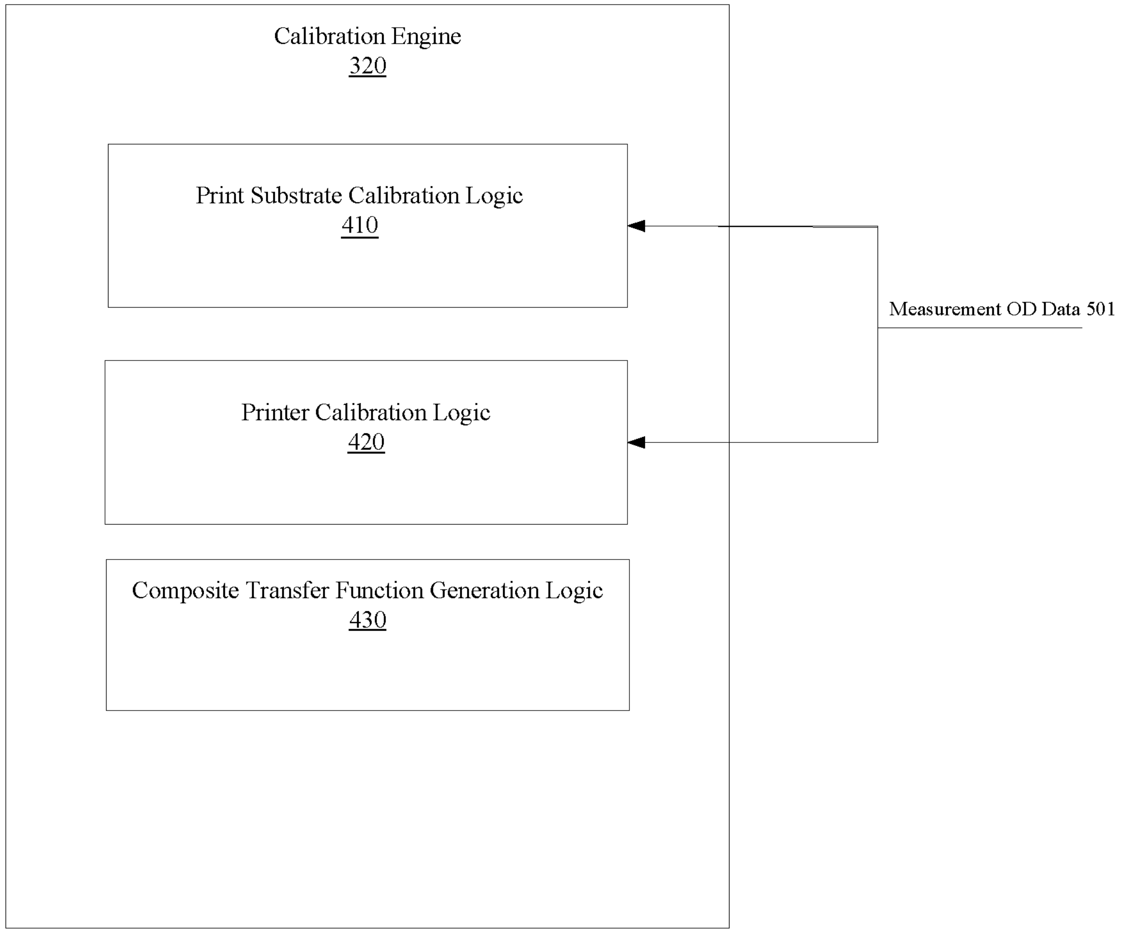
FIG. 4 illustrates one embodiment of calibration engine.

Calibration engine 320 receives the first and second measurement data and generates the print substrate transfer functions. In embodiments, the print substrate transfer functions are implemented to generate composite transfer functions (CTFs). The third measurement data may be used to confirm the accuracy of the composite printer transfer function and print substrate transfer function. FIG. 4 illustrates one embodiment of calibration engine 320 including print substrate calibration logic 410 and printer calibration logic 420. Print substrate calibration logic 410 and printer calibration logic 420 receive measurement OD data 501.

Print substrate calibration logic 410 may be implemented to generate a print substrate transfer function for each customer paper that is to be used at printing system 130. Printer calibration logic 420 is implemented to generate a printer transfer function. Composite transfer function generation logic 430 generates composite transfer functions based on a mathematical function composition of a printer transfer functions and print substrate transfer functions.

In one embodiment, print substrate calibration logic 410 generates updated (or corrected) print substrate transfer functions to compensate for changes to the printer transfer function or changes to print substrate measured responses. In such an embodiment, print substrate calibration logic 410 first generates a first print substrate transfer function based on a current printer transfer function (e.g., PTF_k, where k represents an index of printer transfer functions). Thus, PTF_k, is used to print a test chart on customer paper whose associated measurement data is used to determine a print substrate transfer function (e.g., substrateTF_i_j, where i is an index of different papers and j is index of repeat (e.g., iteration) print substrate transfer functions for the same paper).

In a further embodiment, print substrate calibration logic 410 generates the new print substrate transfer function (e.g., substrateTF_i_j+1) based on the updated printer transfer function (e.g., PTF_k+1). In this embodiment, print substrate calibration logic 410 generates substrateTF_i_j+1 employing measurements using PTF_k+1. The latest versions of PTF and substrateTF are used for printing on the print substrate associated with substrateTF.

Figure 5:
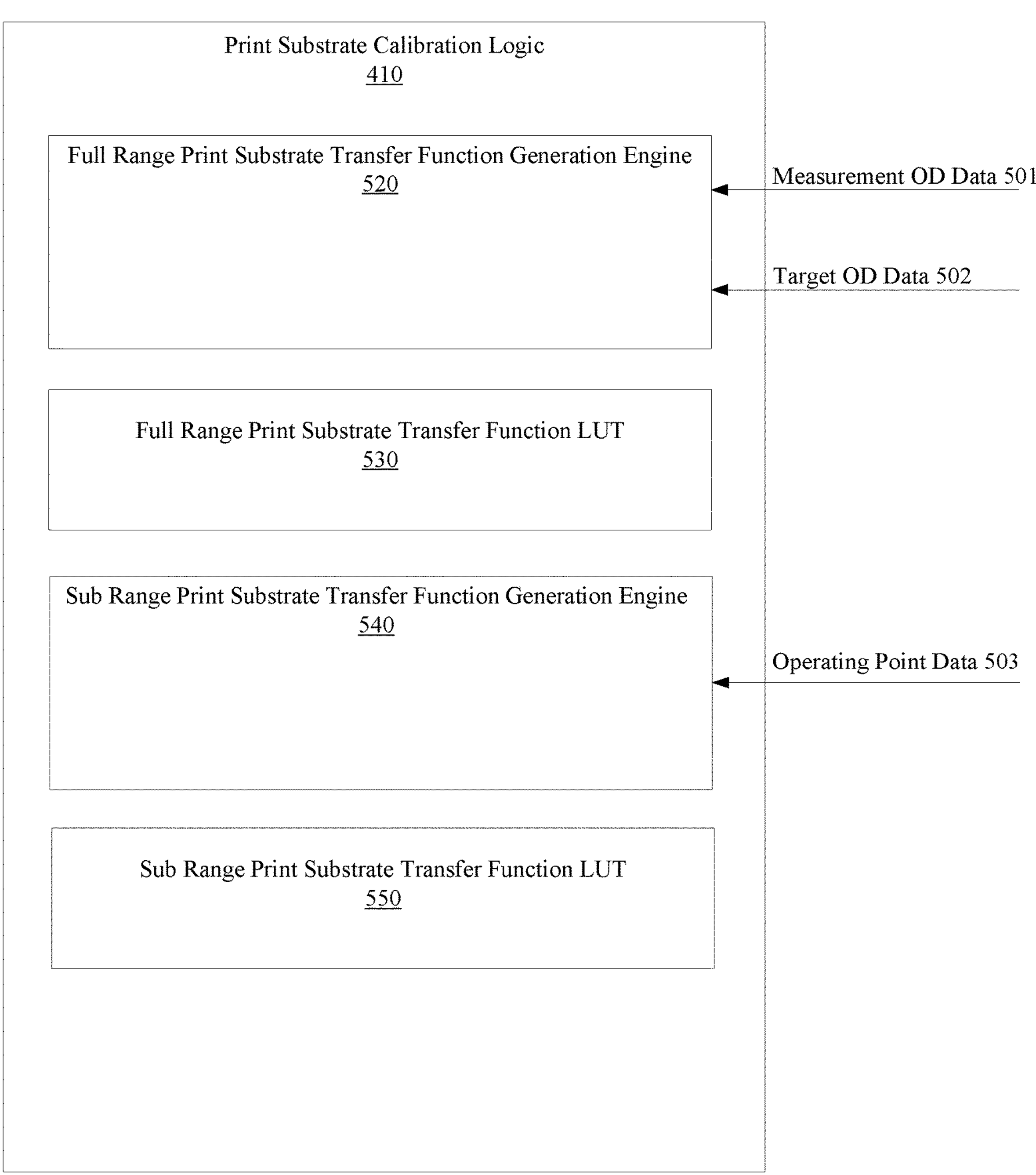
FIG. 5 illustrates one embodiment of print substrate calibration logic.

FIG. 5 illustrates one embodiment of print substrate calibration logic 410. As shown in FIG. 5, print substrate calibration logic 410 includes a full range print substrate transfer function generation engine 520 that receives measurement OD data 501 (associated with printing with a customer paper and the printer transfer function) from measurement module 190 and target OD data 502. In one embodiment, full range print substrate transfer function generation engine 520 generates a full range print substrate transfer function based on the measurement OD data 501 with the printer transfer function used and the target OD data 502. As used herein, a full range transfer function comprises plurality of digital count values calibrated to achieve the target OD 502 where the maximum target optical density (e.g., the maximum target is DDMax) is the largest optical density in the measured OD data 501 obtained with the substrate by an image processing system (e.g., printing system 130).

Figure 6:
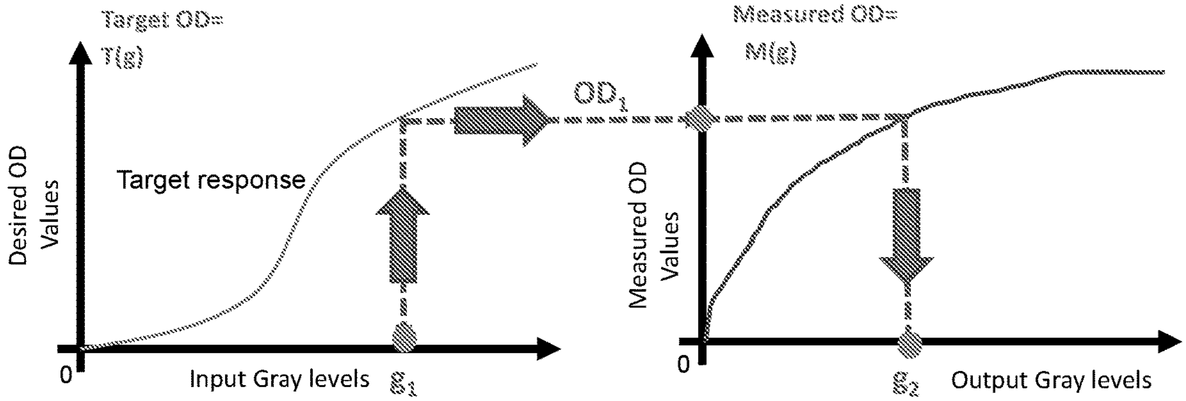
FIG. 6 illustrates one embodiment of a transfer function.

FIG. 6 illustrates one embodiment for generating a transfer function (e.g., a printer transfer function and/or a print substrate transfer function) for all digital count levels (e.g., gray levels). Target OD data T (g) (e.g., target OD data 502) is used as the objective for an applied current halftone with an identity transfer function or current halftone with applied current printer transfer function. The measured response is given by M (g) (e.g., measurement OD data 501). The measured response is determined by printing a single color corresponding to the ink. Given the known response, at gray level $g_1$ the target OD is $OD_1$. To achieve $OD_1$., print level $g_2$ is printed. Using, for example, 0:255 for $g_1$ the set of $g_2$ values defines the transfer function. The transfer function represented as a continuous function defines: g_output=TF (g_input). The expression for the transfer function can be written in terms of the target T and inverse measured responses $M^{-1}$, such that:

$$g\_output=M^{-1}(T(g\_input))=TF(g\_input)$$

Using g_output values as replacement values for the corresponding g_input values, the calibrated target response is achieved for all levels. The transfer functions may be generated as a lookup table (e.g., LUT) or a mathematical curve. The transfer function curve may be generated though mathematical curve fitting (e.g., using cubic spline, smoothing spline curve or other known mathematical approximation techniques). Transfer function curves may then be evaluated with input values to determine output values by direct computation. A technical benefit of lookup tables (e.g., LUT) is that evaluating a lookup table has reduced computational processing burden compared to often complex runtime calculations associated with evaluating curves.

Figure 7:
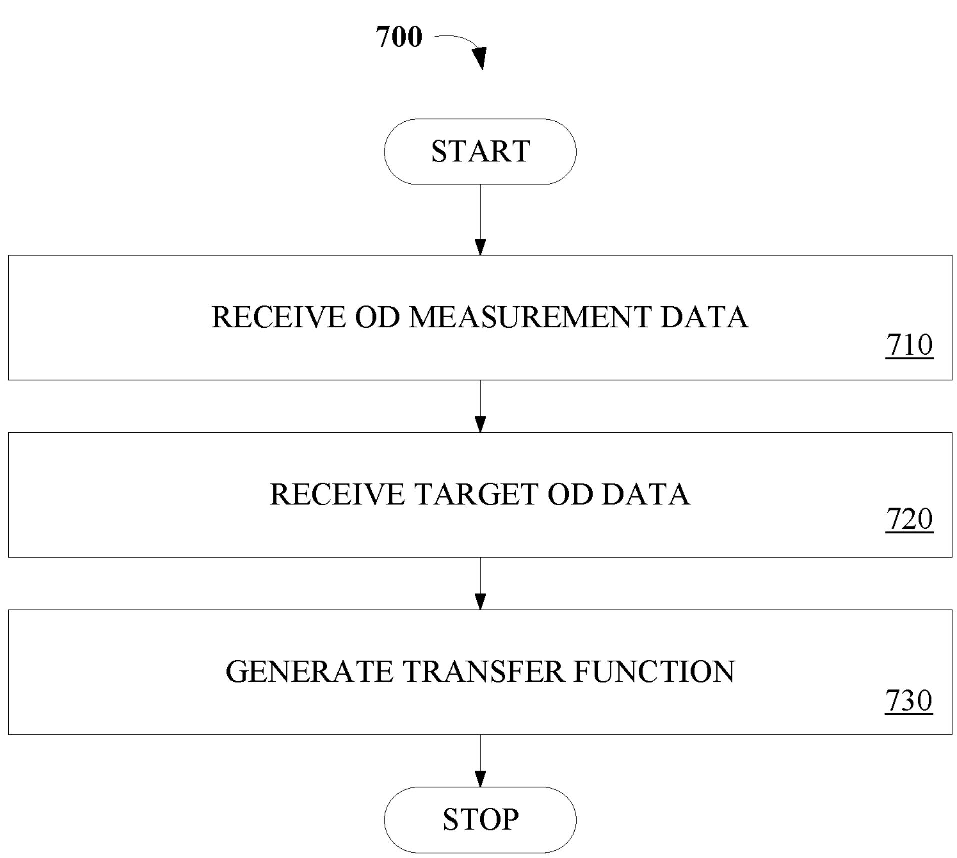
FIG. 7 is a flow diagram illustrating one embodiment of a process for generating a print substrate transfer function.

FIG. 7 is a flow diagram illustrating one embodiment of a process 700 for generating a transfer function (e.g., full range print substrate transfer function). Process 700 may be performed by processing logic that may include hardware (e.g., circuitry, dedicated logic, programmable logic, microcode, etc.), software such as instructions run on a processing device, or a combination thereof. In one embodiment, process 700 is performed by calibration engine 320.

Process 700 begins at processing block 710, where OD measurement data is received. At processing block 720, target OD data is received. At processing block 730, the transfer function is generated based on the measurement OD data 501 and target OD data 502. In one embodiment, processing block 730 generates full range print substrate transfer function FRsubstrateTF_i_j. Transfer functions (e.g., a LUT that represents the transfer function), the OD target associated with the transfer function, and/or the OD measurement data associated with the transfer function may be stored in system memory for later access.

Full range print substrate transfer function generation engine 520 may also generate print substrate transfer functions associated with a different print substrate (e.g., substrateTF_i+1_j) using new test data for the print substrate according to process 700 using the corresponding measurement OD data 501 and target OD data 502 for the new substrate.

According to one embodiment, the above-described process is implemented to generate a full range print substrate transfer function lookup table (LUT) 530 (shown in FIG. 5) including full range print substrate transfer functions (FRsubstrateTF_i_j) associated with each digital count for each color plane. In a further embodiment, LUT 530 also includes a plurality of operating point parameters, including OD, ΔE, percent dot (PD) knockdown, etc. As used herein, ΔE is a metric that indicates how perceptible the change in operating points is, while PD knockdown is an operating point defined by a percent dot reduction from the solid area (100% tint level).

Referring back to FIG. 5, print substrate calibration logic 410 also includes sub range print substrate transfer function generation engine 540. In one embodiment, sub range print substrate transfer function generation engine 540 receives the operating point data, receives a full range transfer function (e.g., full range print substrate transfer function) corresponding to an image processing system and generates a sub range transfer function (e.g., sub range print substrate transfer function) corresponding to the image processing system for each of a plurality of digital count values based on the operating point data and the full range transfer function. Where the full range print substrate transfer function produces a maximum OD (e.g., Dmax) equal to the largest measured OD (e.g., Ddmax) at the end of the tone range and a sub range print substrate transfer function has a maximum OD which is less than the DDmax OD.

A resulting technical benefit is that the sub range transfer function may be generated without obtaining new measurement OD data 501 when a change in the operating point is detected which saves operator time and/or reduced system burden. Other data such as DDmax and DDmin (as explained below) may also be received as needed. In a further embodiment, the input domain of the sub range transfer function matches the input domain of the full range transfer function, and the output range of the subrange transfer function is a subset of the output range of the full range transfer function.

Matching domains or ranges may be accomplished with appropriate selection of data points or with mathematical approximations. Typically, if the full range transfer function is continuous, then approximations are not needed. If the full range transfer function is discrete, then an approximation may be needed. A resulting technical benefit of matching input domains or ranges in that embodiment is to ensure continuity when applying the sub range transfer function in the image processing system. In yet a further embodiment, the input domain of the sub range transfer function matches the range of contone levels in the imaging path, and the output range of the subrange transfer function matches the domain of halftone thresholds employed in the threshold array.

As used herein, a sub range transfer function comprises a plurality of digital count values calibrated to an optical density target value (e.g., a first optical density target value) indicated by the operating point data 503, wherein the optical density target value indicated by the operating point data 503 is less than the DDmax value (e.g., a second optical density target value). A resulting technical benefit for a full range transfer function calibrated to a maximum calibration optical density is that such a full range transfer function contains the data needed for generating a sub range transfer function calibrated to any optical density target that is less than the full range maximum calibration optical density, as explained further below.

In one embodiment, sub range print substrate transfer function generation engine 540 receives full range print substrate transfer functions from full range print substrate transfer function LUT 530 and the operating point data 503 from GUI 330. In such an embodiment, GUI 330 displays the operating parameters stored in LUT 530. Where these LUT values include measured OD vs PD, and ΔE vs PD. DDmax corresponds to the measured OD at 100% tint level and DDmin corresponds to the measured OD at 0% tint level. In a further embodiment, a system operator (or user) reviews the displayed plurality of options (e.g., operating parameters) to select operating point data that achieves a desired results on a substrate based on OD values, ΔE color differences, PD reduction and additional data such as ink drying capability.

Compensation module 230 may convert operating point parameters to OD values (e.g., from OD, PD knockdown, Delta E, etc.) using known conventional image methods (e.g., a look up table containing the relationships between the operating point parameters) with a resulting technical benefit of enabling the input of a plurality of operating point parameter types. In one embodiment, for each tentative user defined operating point parameter selected in the GUI the other two values are also displayed based on the data from the LUT. In a further embodiment, options are available to link the selections for different color planes to avoid having to separately define each color plane. In yet a further embodiment, the user may employ the displayed information to tradeoff PQ parameters to make a final operating point decision.

The Dmax target value, the DDmax value and a minimum substrate OD (DDmin or minimum optical density) value associated with the selection is employed to determine a digital count value (DC_1). In one embodiment, the DDmin value comprises an optical density value associated with an unprinted area of the print substrate (e.g., paper white OD), while DDmax value comprises an optical density of a printed area of the print substrate (e.g., printing using the maximum digital count such as DC=255). Thus, DDMax is the highest OD achievable using the full range TF and DDmin is the paper white OD. DC_1 is the value that for a linear OD target response when used as an input to the Full Range TF, achieves the target Dmax and is given by:

$$DC\_1=(((2\hat{}\text{bitdepth})-1)*(D\text{max}-DD\text{min}))/(DD\text{max}-DD\text{min}),$$

where DC_1 is a float with domain (0,((2^bitdepth)−1)) and bitdepth is the input bit depth for the full range TF.

A sub range print substrate transfer function (SRsubstrateTF_i_j_k) is generated that produces linear OD from DDmin to Dmax, given by:

$$\text{SRsubstrateTF}\_i\_j\_k(DC)=\text{FRsubstrateTF}\_i\_j(DC\_1*DC/((2\hat{}\text{bitdepth})-1)),$$

where k is the index for sub TF having different Dmax target values for the same substrate.

As a result, the sub range print substrate transfer function may be generated for each DC value (e.g., 0-255 for an DC system that has a bit depth of 8 bits). The sub range print substrate function is generated based on DDmax (e.g., the second optical density target value) and the minimum optical density value (e.g., DDmin) of the imaging system for the specific substrate i. A resulting technical benefit for generating a sub range transfer function based on the minimum optical density value of the imaging system is that such a sub range transfer function provides an OD range that includes the minimum optical density value (e.g., unprinted paper white). According to one embodiment, sub range print substrate transfer function generation engine 540 generates a sub range print substrate transfer function lookup table (LUT) 550 (shown in FIG. 5) including sub range print substrate transfer functions (SRsubstrateTF_i_j_k) associated with each digital count for each color plane of the image processing system. The sub range print substrate transfer functions for each color plane may be different from each other because the full range substrate transfer function and DDmax may be different for each color plane. A resulting technical benefit for generating a sub range print substrate transfer function for each color plane is improved density control when printing each color plane with the corresponding sub range print substrate transfer function for each of the color planes.

Figure 8:
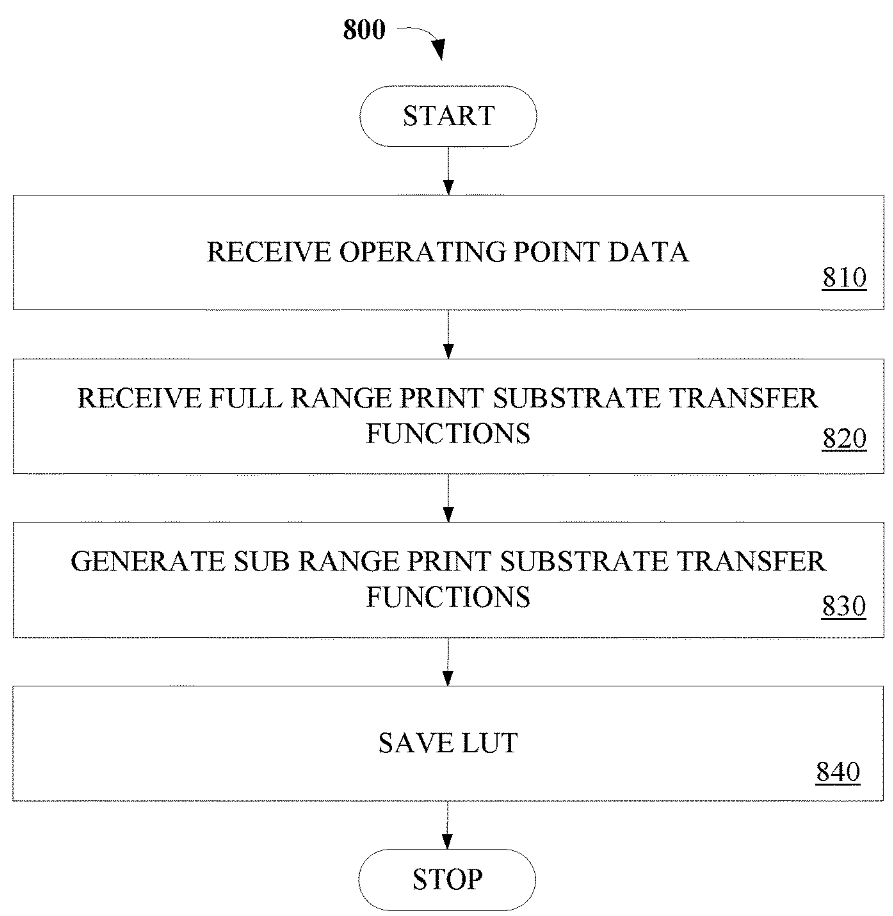
FIG. 8 is a flow diagram illustrating one embodiment of a process for generating a sub range transfer function.

FIG. 8 is a flow diagram illustrating one embodiment of a process 800 for generating a sub range print substrate transfer function. Process 800 for generating a printer transfer function and a print substrate transfer function has been previously described. Process 800 may be performed by processing logic that may include hardware (e.g., circuitry, dedicated logic, programmable logic, microcode, etc.), software such as instructions run on a processing device, or a combination thereof. In one embodiment, process 800 is performed by sub range print substrate transfer function generation engine 540.

Process 800 begins at processing block 810 where the operating point data 503 is received from GUI 330. At processing block 820, full range print substrate transfer functions are received (e.g., from memory, from full range print substrate transfer function generation engine 520 and/or from external to compensation module 230). At processing block 830, sub range print substrate transfer functions are generated based on the operating point data 503 and the full range print substrate transfer functions. At processing block 840, the sub range print substrate transfer functions are saved in sub range print substrate transfer function LUT 550.

Referring back to FIG. 4, printer calibration logic 420 is implemented to generate a printer transfer function, while composite transfer function generation logic 430 generates a CTF based on a printer transfer function and a substrate transfer function. FIG. 9 illustrates one embodiment of composite transfer function generation logic 430 including composite transfer function generation engine 910 and compensation drift logic 920. Composite transfer function generation engine 910 generates CTFs based on a mathematical function composition of printer transfer functions and print substrate transfer functions (e.g., full range or sub range transfer functions). The CTFs are subsequently transmitted to transfer function application module 235 in the form of a LUT 237 (FIG. 2A) to be applied to a CTI data. In one embodiment, the range of a print substrate transfer function equals the domain of the printer transfer function and has the previously described domain. Based on the above, composite transfer function generation logic 430 generates CTF values via a discrete composite transfer function.

Figure 10:
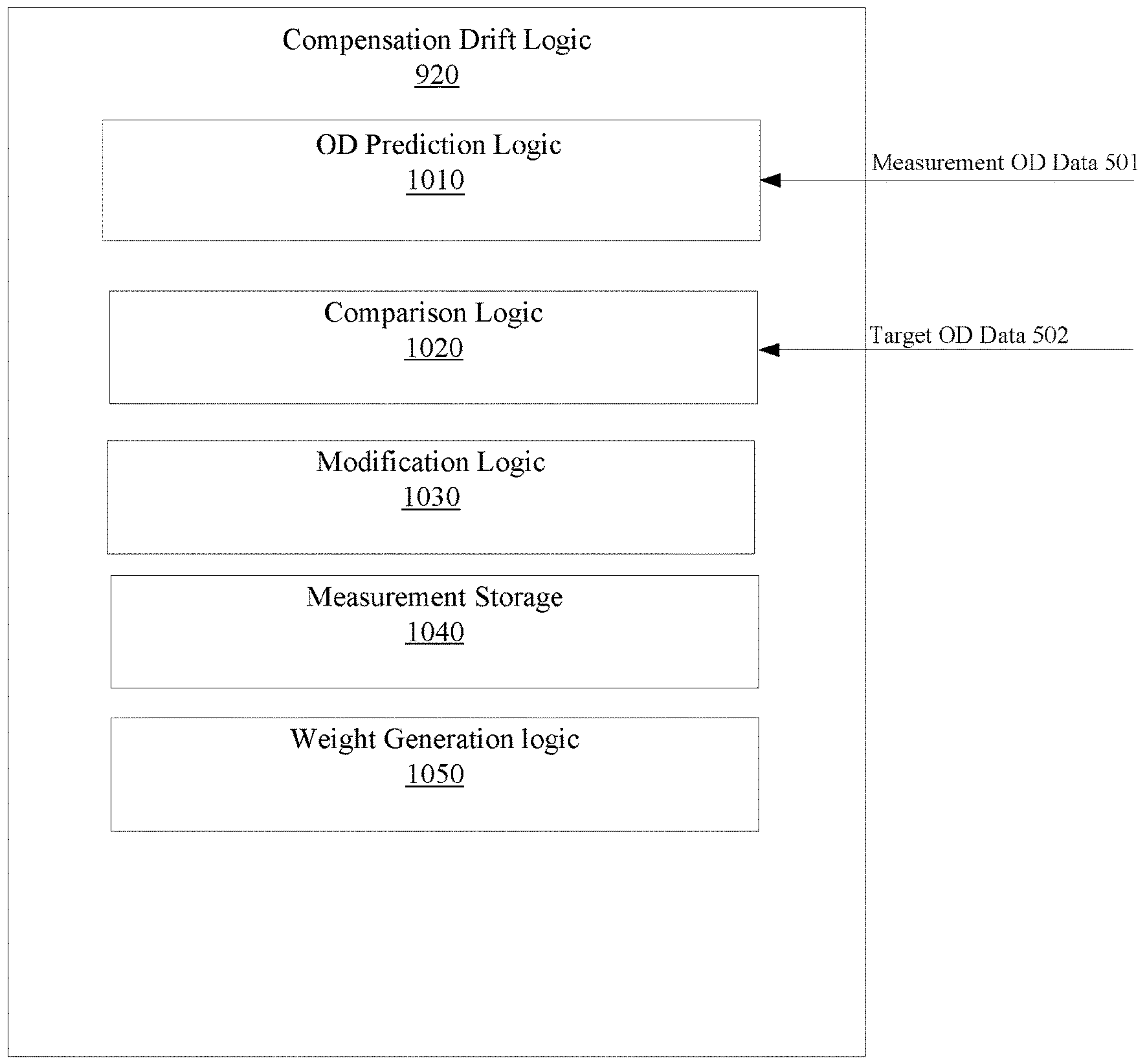
FIG. 10 illustrates one embodiment of compensation drift logic.

Compensation drift logic 920 is implemented to perform density drift calculations to facilitate the resulting technical benefit of the generation of updated compensation transfer functions. FIG. 10 illustrates one embodiment of compensation drift logic 920. According to one embodiment, compensation drift logic 920 receives print response measurement data corresponding to print image printed on a print substrate with a transfer function applied to print image data that defines the print image and generates a compensation transfer function based on the print response data and a target response upon a determination that average print response data exceeds a first threshold. According to another embodiment, compensation drift logic 920 receives print response measurement data corresponding to each of a plurality of measurement samples of print image printed on a print substrate with a transfer function applied to print image data that defines the print image, generates average print response data based on the print response measurement data and generates a compensation transfer function based on the average print response data and target response upon a determination that the absolute value of the average print response data with a transfer function applied exceeds a first threshold. A resulting technical benefit for generating a compensation transfer function based on the average print response data is that impact of transient noise in the measurement data is minimized.

As shown in FIG. 10, compensation drift logic 920 includes OD prediction logic 1010, which receives recent measurement OD data 501 (e.g., upon initiation of a calibration process at calibration generator 305) generated by applying the identity transfer function during print image processing. As discussed above, the measurement OD data 501 is generated from a print image that includes test patterns corresponding to one of a plurality of print heads 162. In embodiments, a printed test pattern is included as part of a production print job. In such an embodiment, production print job data images are printed by applying a current compensation transfer function while the test pattern image is printed by applying the identity transfer function. A resulting technical benefit of printing the test pattern with the identity transfer function applied to the test pattern image includes computational efficiencies for common processing with other test marks, which are included as part of the test pattern image and require the identity transfer function for proper printing.

In one embodiment, compensation drift logic 920 generates processed print response data (e.g., first processed print response data or first predicted response data). In such an embodiment, the processed print response data is generated by applying a current compensation transfer function (e.g., current composite transfer function) to the measurement OD data 501 to determine a predicted OD response. A resulting technical benefit of applying a compensation transfer function to measured response data corresponding to printing with an identity transfer function is to determine the predicted response with compensation.

Comparison logic 1020 compares the processed print response data to target OD data 502 to determine whether the difference exceeds a predetermined first threshold (e.g., |Pred OD−Target OD|<0.02). Modification logic 1030 modifies the measurement OD data 501 using the printer TF to account for the printer TF not being used to generate measurement OD data 501. Modification logic 1030 stores the modified measurement OD data (herein also known as processed print response data, predicted OD response, or Pred OD) in measurement storage 1040. In one embodiment, measurement storage 1040 stores modified measurement OD data for a predetermined quantity (e.g., 3) of most recent measurement OD data 501 results. Weight generation logic 1050 generates weighted average measured print response data for each input DC level, represented as follows, where n is the number of density measurements that are averaged:

$$\frac{n * \text{Average } RT \text{ Density} + 3 * \text{Full Range } OD \text{ Data}}{n+3}$$

According to one embodiment, compensation drift logic 920 facilitates the generation of an updated compensation full range substrate transfer function based on the averaged measured print response data. In such an embodiment, the updated compensation full range substrate transfer function is generated via full range print substrate transfer function generation engine 520 (e.g., using the process 700 in FIG. 7) and composite transfer function generation engine 910. For example, an intermediate compensation transfer function (e.g., full range print substrate transfer function) is generated based on the averaged measured print response data while the updated compensation transfer function (e.g., composite transfer function) is generated based on the intermediate compensation transfer function and the target response data.

In a further embodiment, the updated compensation transfer function replaces the current compensation transfer function, which is used to print the remaining part of a print job. At the end of the print job updated metadata is stored. This includes new DDmax, DDmin, full range substrate transfer function LUT 530 and updated operating point data 503. In such an embodiment, metadata comprises print substrate identification and print settings (e.g., print speed, print resolution, etc.). In a further embodiment, updated compensation transfer functions may be later retrieved using the metadata (e.g., modification logic 1030 retrieves the updated compensation transfer functions by matching associated metadata parameters). Resulting technical benefits from storing and retrieving updated compensation transfer functions in association with metadata includes avoiding the re-generation of the compensation transfer functions (or intermediate compensation transfer functions) when the print system metadata matches a prior metadata.

OD prediction logic 1010 is implemented to generate second processed print response data including a second predicted OD based on the updated compensation transfer function. Comparison logic 1020 then compares the second predicted OD to target OD data 502 to determine whether the difference exceeds a user defined threshold set by an operator using GUI 330 (e.g., |New TF Pred OD−Target OD|<user defined quality level). Where New TF Pred OD is the second processed measured print response. New TF Pred OD-Measured OD (current updated compensation transfer function (DC)). In one embodiment, comparison logic 1020 transmits an alert to GUI 330 for display upon a determination that the difference between the second processed print response data and the target OD data 502 e.g., a second OD response absolute difference exceeds the user defined threshold (e.g., a second threshold). However, the updated compensation transfer function is transmitted to transfer function application module 235 for storage at LUT 237 to be applied to CTI data and the alert is bypassed upon a determination that the difference between the second processed print response data and the target OD data 502 does not exceed the user defined threshold. A resulting technical benefit for transmitting the alert when the second threshold is exceeded is to prompt a system or user response (e.g., initiate a full recalibration for the current substrate instead of employing updated transfer functions). In one embodiment, the second threshold value is larger than the first threshold value, which yields the technical benefit of a different response for each threshold.

Figure 11:
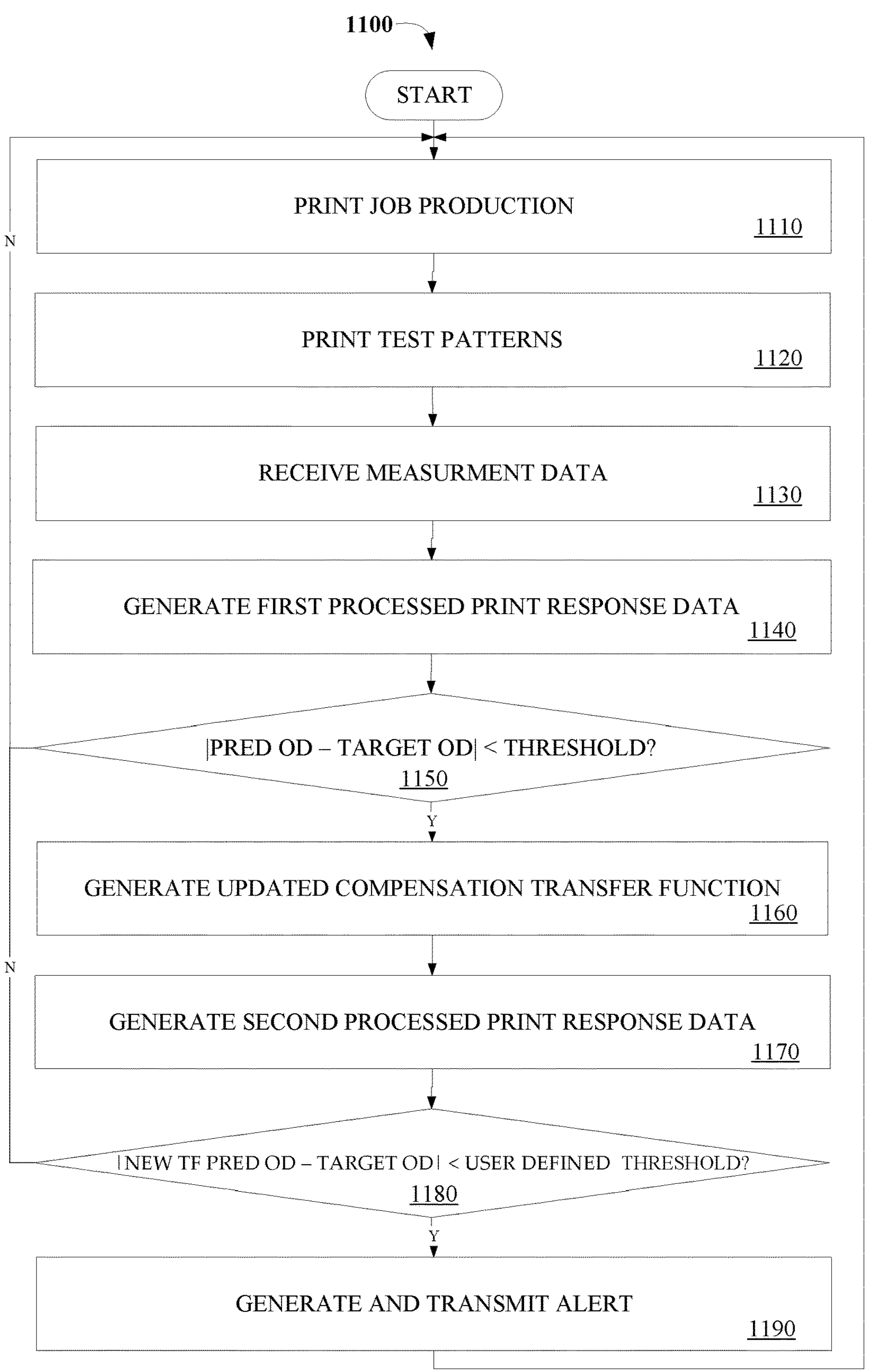
FIG. 11 is a flow diagram illustrating one embodiment of a process for performing print density drift compensation.

FIG. 11 is a flow diagram illustrating one embodiment of a process 1100 for performing drift compensation. Process 1100 for generating a printer transfer function and a print substrate transfer function has been previously described. Process 1100 may be performed by processing logic that may include hardware (e.g., circuitry, dedicated logic, programmable logic, microcode, etc.), software such as instructions run on a processing device, or a combination thereof. In one embodiment, process 1100 is performed by compensation drift logic 920.

At processing block 1110, a print job production is performed. As discussed above, the print job production is performed by applying a current compensation transfer function to print image data that defines the production print job. At processing block 1120, test patterns are printed by applying a transfer function (e.g., identity transfer function) to print image data that defines the test patterns. At processing block 1130, measurement data corresponding to the printed test patterns (e.g., generated from measurement of the printed test patterns) is received.

At processing block 1140, first processed print response data is generated (e.g., Pred OD) by applying a current compensation transfer function to the first print response measurement data. At decision block 1150, a determination is made as to whether the absolute difference between the processed print response data and a target print response exceeds a predetermined first threshold (e.g., $|\text{Pred OD}-\text{Target OD}|<0.02$). If not, control is returned to processing block 1110 where process 1100 is repeated (e.g., bypass generating an updated compensation transfer function and/or replacing the current compensation transfer function). Otherwise, an updated compensation transfer function is generated, processing block 1160.

Figure 12:
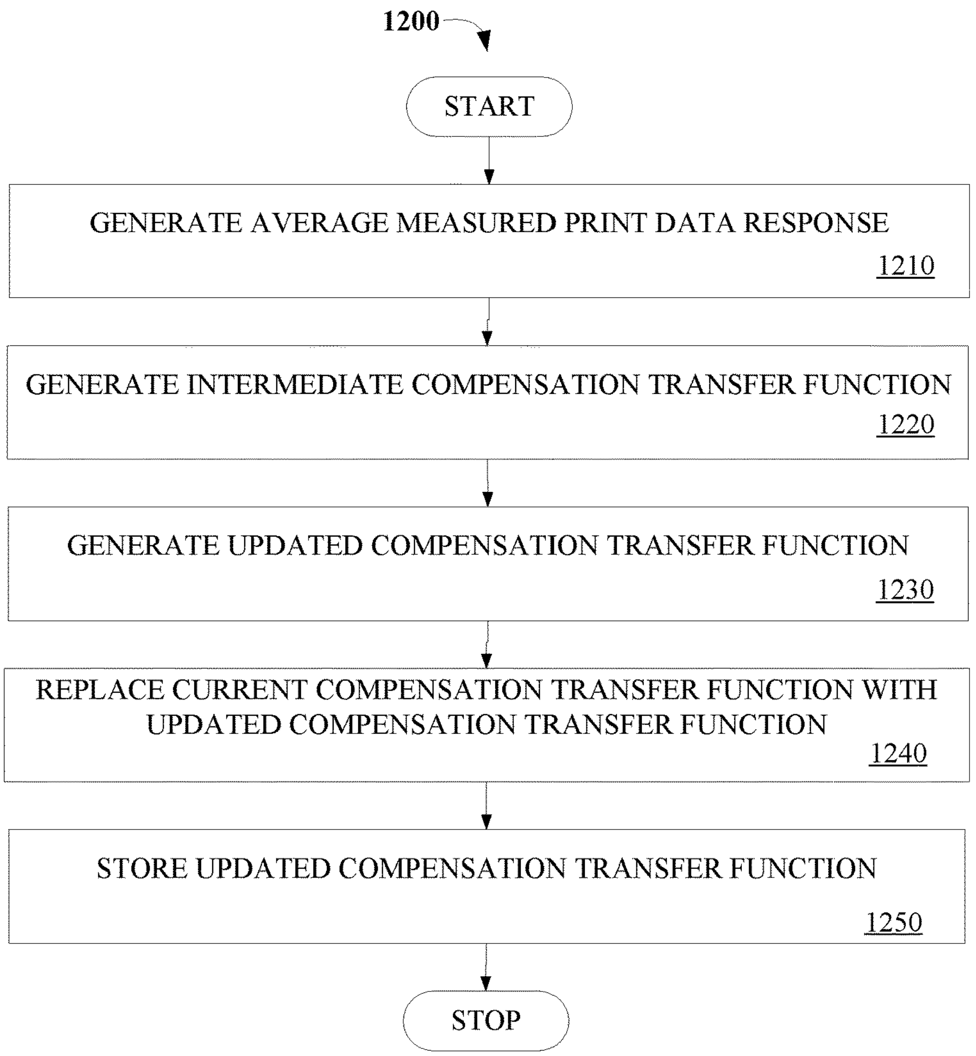
FIG. 12 is a flow diagram illustrating one embodiment of a process for generating an updated compensation transfer function.

FIG. 12 is a flow diagram illustrating one embodiment of a process 1200 for generating an updated compensation transfer function. Process 1200 for generating a printer transfer function and a print substrate transfer function has been previously described. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by full range print substrate transfer function generation engine 520 (e.g., using the process 700 in FIG. 7) and composite transfer function generation engine 910.

At processing block 1210, an average measured print response data is generated. At processing block 1220, an intermediate compensation transfer function is generated based on the average measured print data response data. At processing block 1230, the updated compensation transfer function is generated based on the intermediate compensation transfer function and the target response data. At processing block 1240, the updated compensation transfer function replaces the current compensation transfer function so that the updated compensation transfer function is available for print image processing. At processing block 1250, the updated compensation transfer function is stored. A resulting technical benefit for generating the updated compensation transfer function based on an intermediate compensation transfer function includes removing the need to capture new measurement OD data 501 as a result of changed operating point data 503 as discussed above for full range and sub range print substrate transfer functions.

Referring back to FIG. 11, second processed print response data is generated based on the updated compensation transfer function, processing block 1170. At decision block 1180, a determination is made as to whether an absolute difference between the second processed print response data and the target OD data exceeds the user defined second threshold set by an operator using GUI 330 (e.g., $|\text{New TF Pred OD}-\text{Target OD}|<\text{user defined quality level}$). If not, control is again returned to processing block 1110 to repeat process 1100. However, at processing block 1190 an alert is generated and transmitted (e.g., to GUI 330) upon a determination that the difference between the second processed print response data and the target OD data exceeds the user defined second threshold.

Figure 13:
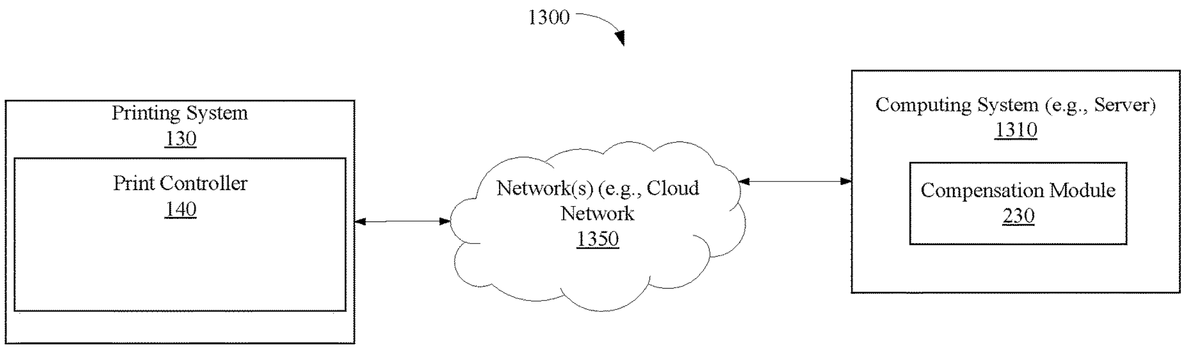
FIG. 13 illustrates one embodiment of a compensation module implemented in a network.

Although shown as a component of print controller 140, other embodiments may feature compensation module 230 included within an independent device communicably coupled to print controller 140. For instance, FIG. 13 illustrates one embodiment of compensation module 230 implemented in a network 1300. As shown in FIG. 13, compensation module 230 is included within a computing system 1310 and communicates with printing system 130 via a cloud network 1350.

Figure 14:
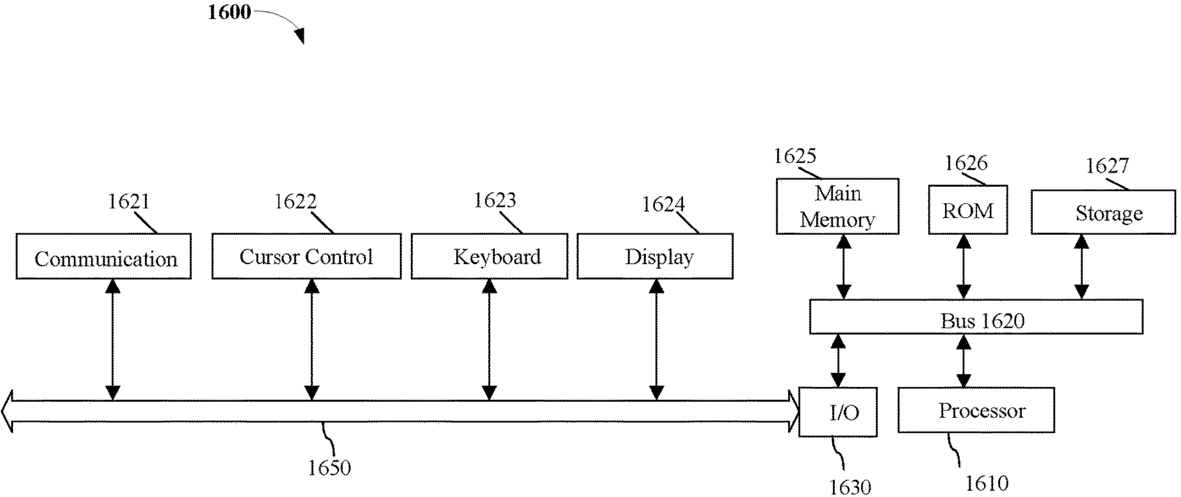
FIG. 14 illustrates one embodiment of a computer system.

FIG. 14 illustrates a computer system 1600 on which printing system 130, print controller 140 and compensation module 230 may be implemented. Computer system 1600 includes a system bus 1620 for communicating information, and a processor 1610 coupled to bus 1620 for processing information.

Computer system 1600 further comprises a random-access memory (RAM) or other dynamic storage device 1625 (referred to herein as main memory), coupled to bus 1620 for storing information and instructions to be executed by processor 1610. Main memory 1625 also may be used for storing temporary variables or other intermediate information during execution of instructions by processor 1610. Computer system 1600 also may include a read only memory (ROM) and or other static storage device 1626 coupled to bus 1620 for storing static information and instructions used by processor 1610.

A data storage device 1627 such as a magnetic disk or optical disc and its corresponding drive may also be coupled to computer system 1600 for storing information and instructions. Computer system 1600 can also be coupled to a second I/O bus 1650 via an I/O interface 1630. A plurality of I/O devices may be coupled to I/O bus 1650, including a display device 1624, an input device (e.g., an alphanumeric input device 1623 and or a cursor control device 1622). The communication device 1621 is for accessing other computers (servers or clients). The communication device 1621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to receive print response measurement data corresponding to print image printed on a print substrate with a transfer function applied to print image data that defines the print image, generate first processed print response data based on the print response measurement data, determine whether an absolute difference between the first processed print response data and a target response exceeds a first threshold and generate an updated compensation transfer function based on the first processed print response data and the target response upon a determination that the absolute difference exceeds a first threshold.

Example 2 includes the subject matter of Example 1, wherein generating the first processed print response data further comprises applying a current compensation transfer function to the print response measurement data.

Example 3 includes the subject matter of Examples 1 and 2, wherein the print response measurement data includes data corresponding to each of a plurality of measurement samples; and generating the first processed print response data further comprises averaging the data corresponding to each of the plurality of measurement samples.

Example 4 includes the subject matter of Examples 1-3, wherein the compensation logic further to generate second processed print response data by applying the updated compensation transfer function to the print response measurement data, determine a second response difference comprising an absolute value of the difference between the second processed print response data and a second threshold, generate an alert upon a determination that the second response difference exceeds a second threshold and bypass the alert upon a determination that the second response difference does not exceed a second threshold.

Example 5 includes the subject matter of Examples 1-4, wherein generating the updated compensation transfer function comprises generating an intermediate compensation transfer function based on the first processed print response data and generating the updated compensation transfer function based on the intermediate compensation transfer function and the target response.

Example 6 includes the subject matter of Examples 1-5, wherein the compensation logic stores the updated compensation transfer function with compensation metadata.

Example 7 includes the subject matter of Examples 1-6, wherein the compensation logic further to retrieve the updated compensation transfer function using the compensation metadata.

Example 8 includes the subject matter of Examples 1-7, wherein at least one physical memory device to store a graphical user interface (GUI) and the one or more processors coupled with the at least one physical memory device to execute the GUI to display the alert.

Example 9 includes the subject matter of Examples 1-8, further comprising one or more print engines.

Example 10 includes the subject matter of Examples 1-9, wherein the print response measurement data comprises optical density data.

Some embodiments pertain to Example 11 that includes at least one computer readable medium having instructions stored thereon, which when executed by one or more processors, cause the processors to receive print response measurement data corresponding to print image printed on a print substrate with a transfer function applied to print image data that defines the print image, generate first processed print response data based on the print response measurement data, determine whether an absolute difference between the first processed print response data and a target response exceeds a first threshold and generate an updated compensation transfer function based on the first processed print response data and the target response upon a determination that the absolute difference exceeds a first threshold.

Example 12 includes the subject matter of Example 11, wherein generating the first processed print response data further comprises applying a current compensation transfer function to the print response measurement data.

Example 13 includes the subject matter of Examples 11 and 12, wherein the print response measurement data includes data corresponding to each of a plurality of measurement samples; and generating the first processed print response data further comprises averaging the data corresponding to each of the plurality of measurement samples.

Example 14 includes the subject matter of Examples 11-13, having instructions stored thereon, which when executed by one or more processors, further cause the processors to generate second processed print response data by applying the updated compensation transfer function to the print response measurement data, determine a second response difference comprising an absolute value of the difference between the second processed print response data and a second threshold, generate an alert upon a determination that the second response difference exceeds a second threshold and bypass the alert upon a determination that the second response difference does not exceed a second threshold.

Example 15 includes the subject matter of Examples 11-14, wherein generating the updated compensation transfer function comprises generating an intermediate compensation transfer function based on the first processed print response data and generating the updated compensation transfer function based on the intermediate compensation transfer function and the target response.

Some embodiments pertain to Example 16 that includes a method comprising receiving print response measurement data corresponding to print image printed on a print substrate with a transfer function applied to print image data that defines the print image, generating first processed print response data based on the print response measurement data, determining whether an absolute difference between the first processed print response data and a target response exceeds a first threshold and generating an updated compensation transfer function based on the first processed print response data and the target response upon a determination that the absolute difference exceeds a first threshold.

Example 17 includes the subject matter of Example 16, wherein generating the first processed print response data further comprises applying a current compensation transfer function to the print response measurement data.

Example 18 includes the subject matter of Examples 16 and 17, wherein the print response measurement data includes data corresponding to each of a plurality of measurement samples; and generating the first processed print response data further comprises averaging the data corresponding to each of the plurality of measurement samples.

Example 19 includes the subject matter of Examples 16-18, further comprising generating second processed print response data by applying the updated compensation transfer function to the print response measurement data, determine a second response difference comprising an absolute value of the difference between the second processed print response data and a second threshold, generating an alert upon a determination that the second response difference exceeds a second threshold and bypassing the alert upon a determination that the second response difference does not exceed a second threshold.

Example 20 includes the subject matter of Examples 16-19, wherein generating the updated compensation transfer function comprises generating an intermediate compensation transfer function based on the first processed print response data and generating the updated compensation transfer function based on the intermediate compensation transfer function and the target response.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:

at least one physical memory device to store compensation logic; and one or more processors coupled with the at least one physical memory device to execute the compensation logic to:

receive print response measurement data corresponding to print image printed on a print substrate with a transfer function applied to print image data that defines the print image;

apply a current compensation transfer function to the print response measurement data to generate first processed print response data;

determine whether an absolute difference between the first processed print response data and a target response exceeds a first threshold; and generate an updated compensation transfer function based on the first processed print response data and the target response upon a determination that the absolute difference exceeds a first threshold.

2. The system of claim 1, wherein the print response measurement data includes data corresponding to each of a plurality of measurement samples; and generating the first processed print response data further comprises averaging the data corresponding to each of the plurality of measurement samples.

3. The system of claim 2, wherein the compensation logic further to:

generate second processed print response data by applying the updated compensation transfer function to the print response measurement data;

determine a second response difference comprising an absolute value of the difference between the second processed print response data and a second threshold;

generate an alert upon a determination that the second response difference exceeds a second threshold; and bypass the alert upon a determination that the second response difference does not exceed a second threshold.

4. The system of claim 1, wherein generating the updated compensation transfer function comprises:

generating an intermediate compensation transfer function based on the first processed print response data; and generating the updated compensation transfer function based on the intermediate compensation transfer function and the target response.

5. The system of claim 4, wherein the compensation logic stores the updated compensation transfer function with compensation metadata.

6. The system of claim 5, wherein the compensation logic further to retrieve the updated compensation transfer function using the compensation metadata.

7. The system of claim 3, wherein at least one physical memory device to store a graphical user interface (GUI) and the one or more processors coupled with the at least one physical memory device to execute the GUI to display the alert.

8. The system of claim 1, further comprising one or more print engines.

9. The system of claim 1 wherein the print response measurement data comprises optical density data.

10. At least one non-transitory computer readable medium having instructions stored thereon, which when executed by one or more processors, cause the processors to:

receive print response measurement data corresponding to print image printed on a print substrate with a transfer function applied to print image data that defines the print image;

apply a current compensation transfer function to the print response measurement data to generate first processed print response data;

determine whether an absolute difference between the first processed print response data and a target response exceeds a first threshold; and generate an updated compensation transfer function based on the first processed print response data and the target response upon a determination that the absolute difference exceeds a first threshold.

11. The computer readable medium of claim 10, wherein the print response measurement data includes data corresponding to each of a plurality of measurement samples; and generating the first processed print response data further comprises averaging the data corresponding to each of the plurality of measurement samples.

12. The computer readable medium of claim 11, having instructions stored thereon, which when executed by one or more processors, further cause the processors to:

generate second processed print response data by applying the updated compensation transfer function to the print response measurement data;

determine a second response difference comprising an absolute value of the difference between the second processed print response data and a second threshold;

generate an alert upon a determination that the second response difference exceeds a second threshold; and bypass the alert upon a determination that the second response difference does not exceed a second threshold.

13. The computer readable medium of claim 10, wherein generating the updated compensation transfer function comprises:

generating an intermediate compensation transfer function based on the first processed print response data; and generating the updated compensation transfer function based on the intermediate compensation transfer function and the target response.

14. A method comprising:

receiving print response measurement data corresponding to print image printed on a print substrate with a transfer function applied to print image data that defines the print image;

applying a current compensation transfer function to the print response measurement data to generate first processed print response data;

determining whether an absolute difference between the first processed print response data and a target response exceeds a first threshold; and generating an updated compensation transfer function based on the first processed print response data and the target response upon a determination that the absolute difference exceeds a first threshold.

15. The method of claim 14, wherein generating the first processed print response data further comprises applying a current compensation transfer function to the print response measurement data.

16. The method of claim 14, wherein the print response measurement data includes data corresponding to each of a plurality of measurement samples; and generating the first processed print response data further comprises averaging the data corresponding to each of the plurality of measurement samples.

17. The method of claim 16, further comprising:

generating second processed print response data by applying the updated compensation transfer function to the print response measurement data;

determine a second response difference comprising an absolute value of the difference between the second processed print response data and a second threshold;

generating an alert upon a determination that the second response difference exceeds a second threshold; and bypassing the alert upon a determination that the second response difference does not exceed a second threshold.

18. The method of claim 14, wherein generating the updated compensation transfer function comprises:

generating an intermediate compensation transfer function based on the first processed print response data; and generating the updated compensation transfer function based on the intermediate compensation transfer function and the target response.

19. The computer readable medium of claim 12, further comprising displaying an alert.

20. The computer readable medium of claim 12, wherein the print response measurement data comprises optical density data.

21. The method of claim 17 wherein the print response measurement data comprises optical density data.

* * * * *